US007197703B1

(12) United States Patent
Rule

(10) Patent No.: US 7,197,703 B1
(45) Date of Patent: Mar. 27, 2007

(54) SYSTEM AND METHODOLOGY FOR THE STORAGE AND MANIPULATION OF DOCUMENTS

(75) Inventor: James W. Rule, Edmonds, OK (US)

(73) Assignee: Critical Technologies, Inc., Oklahoma City, OK (US)

(*) Notice: Subject to any disclaimer, the term of this patent is extended or adjusted under 35 U.S.C. 154(b) by 817 days.

(21) Appl. No.: 09/828,158

(22) Filed: Apr. 9, 2001

(51) Int. Cl.
*G06F 17/00* (2006.01)

(52) U.S. Cl. .................. 715/526; 715/513; 715/500
(58) Field of Classification Search ............. 715/534, 715/501.1, 526, 513, 512, 760, 500, 835
See application file for complete search history.

(56) References Cited

U.S. PATENT DOCUMENTS

| | | | | |
|---|---|---|---|---|
| 5,675,507 A * | 10/1997 | Bobo, II | ............ | 709/206 |
| 5,699,458 A * | 12/1997 | Sprague | ............ | 382/250 |
| 5,737,599 A * | 4/1998 | Rowe et al. | ............ | 707/10 |
| 5,781,785 A * | 7/1998 | Rowe et al. | ............ | 715/513 |
| 5,819,301 A * | 10/1998 | Rowe et al. | ............ | 715/513 |
| 5,943,679 A * | 8/1999 | Niles et al. | ............ | 715/526 |
| 6,073,148 A * | 6/2000 | Rowe et al. | ............ | 715/542 |
| 6,105,042 A * | 8/2000 | Aganovic et al. | ............ | 715/500 |
| 6,262,732 B1 * | 7/2001 | Coleman et al. | ............ | 715/835 |
| 6,275,829 B1 * | 8/2001 | Angiulo et al. | ............ | 707/104.1 |
| 6,324,545 B1 * | 11/2001 | Morag | ............ | 707/202 |
| 6,350,066 B1 * | 2/2002 | Bobo, II | ............ | 706/206 |
| 6,389,159 B2 * | 5/2002 | Gilman et al. | ............ | 382/162 |
| 6,437,797 B1 * | 8/2002 | Ota | ............ | 345/638 |
| 6,457,026 B1 * | 9/2002 | Graham et al. | ............ | 715/512 |
| 6,496,206 B1 * | 12/2002 | Mernyk et al. | ............ | 715/835 |
| 6,582,475 B2 * | 6/2003 | Graham et al. | ............ | 715/513 |
| 6,613,100 B2 * | 9/2003 | Miller | ............ | 715/526 |
| 6,665,838 B1 * | 12/2003 | Brown et al. | ............ | 715/501.1 |
| 6,674,472 B1 * | 1/2004 | Tsutsui | ............ | 348/333.05 |
| 6,700,612 B1 * | 3/2004 | Anderson et al. | ............ | 348/333.11 |
| 6,781,711 B1 * | 8/2004 | Rijavec et al. | ............ | 358/1.2 |
| 6,938,051 B1 * | 8/2005 | Burger et al. | ............ | 707/104.1 |
| 2005/0022133 A1 * | 1/2005 | Sakamoto et al. | ............ | 715/760 |

* cited by examiner

*Primary Examiner*—Doug Hutton
*Assistant Examiner*—James H Blackwell
(74) *Attorney, Agent, or Firm*—Nixon Peabody, LLP; Raymond Van Dyke

(57) ABSTRACT

A document imaging platform system and methodology for capturing, transmitting, storing, retrieving and displaying documents in a shared-system environment using the Internet or other network is disclosed. Through utilization of thumbnail images along with full images, transmission of multipage documents is facilitated, avoiding system bottlenecks. Document security is hierarchically based with document control being available to system users in addition to system administrators.

20 Claims, 3 Drawing Sheets

SYSTEM AND METHODOLOGY FOR THE STORAGE AND MANIPULATION OF DOCUMENTS

BACKGROUND OF THE PRESENT INVENTION

1. Field of the Invention

The present invention relates generally to the manipulation of stored data, more particularly to systems and methodologies for the capture, transmission, management, storage, retrieval and display of document images in a shared-system environment using the Internet or other network.

2. Background of the Present Invention

Since the introduction of paper, there has been the problem of storing documents and making them readily available for later use. As society entered the Information Age, an ever growing mountain of paper documents became increasingly difficult to store and manage. Certain document-intensive industries, such as banking, have come under increasing pressure to manage this problem.

With the advent of the computer and increasing data storage capabilities, text and image-based data are now being electronically stored at an even greater pace. Since geographical images require considerably more storage space and processing power to manipulate than a simpler text-based system, conventional commercial computer systems heretofore have been unable to adequately service this growing segment of the industry, e.g., due to inadequate storage capacities on other technological bottleneck. An additional problem with image-based information is the inability at present to search the graphical image itself and the need to correlate the image with sufficient relevant text-based data to permit search or query capability and retrieval.

Conventional models for document imaging systems involve usage of imaging equipment and software at a single central facility, e.g., at a hospital or bank, under the control and direction of a central computer at that facility. Under this model, however, companies having multiple offices, desiring to centralize their records, have to ship their documents (either physically or electronically) to a central computer for centrally storing all of the documents and permitting access via phone or other dedicated lines.

Despite the advent of networking, e.g., local area networks or LANs and now the Internet, this central computer model has nonetheless retained hold. With the emergence of the Internet as a platform for commerce, however, new paradigms of operation became possible. Instead of companies investing heavily in equipment and manpower to support the scanning, indexing and storage of their own documents, companies could eliminate this entire overhead by outsourcing these and other data management functions. Applicants have recognized the need for this and other such services and have designed an improved system and methodology for servicing this heretofore unrecognized but greatly desired need.

It is, therefore, an object of the present invention to provide an improved system and methodology for document storage, management and retrieval.

It is also an object of the present invention to provide an improved remote distributed capture system, eliminating the need to ship documents to a central point for processing.

SUMMARY OF THE INVENTION

The present invention is directed to a document imaging platform system and methodology for capturing, transmitting, storing, retrieving and displaying documents in a shared-system environment using the Internet or other network. Through utilization of thumbnail images along with full images, transmission of multipage documents is facilitated, avoiding system bottlenecks. Document security is hierarchically based with document control being available to system users in addition to system administrators.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
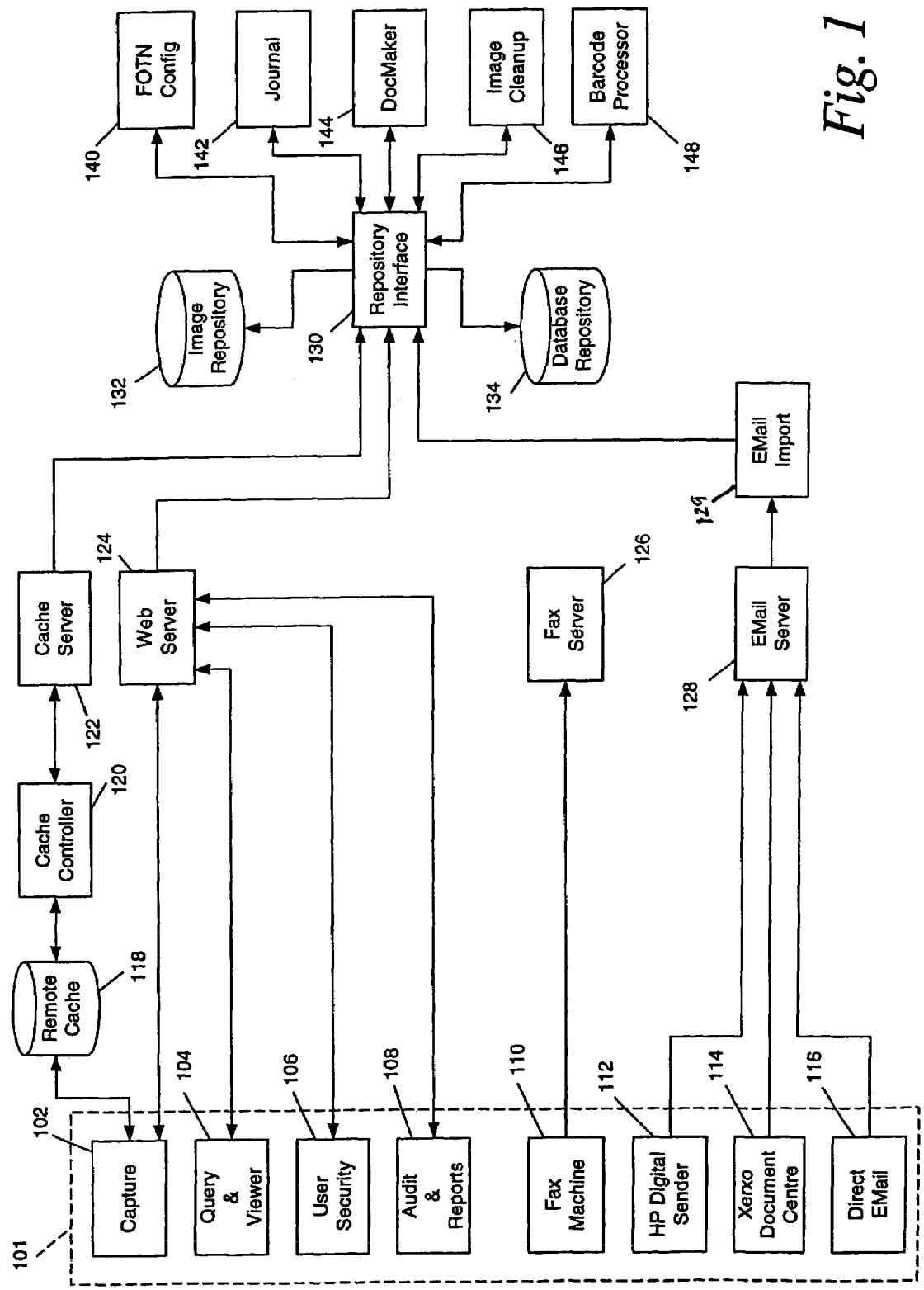
FIG. 1 is a diagram of a system incorporating the principles of the present invention.

With reference now to FIG. 1 of the Drawings, there is illustrated an exemplary embodiment of a system configuration pursuant to the teachings of the present invention and generally referred to by the reference numeral 100. In particular, there is illustrated a system and methodology for capturing document images, transmitting these images to an image repository and permitting access to those stored images by an outside user.

At the user side, designated generally in FIG. 1 by the reference numeral 101, a document (or more generally an object) may be captured, i.e., scanned by a scanner in a conventional manner. Each document image is, upon capture, assigned a unique system-wide image identification number, with this image identification number being stored in a central database repository 134. The database repository 134 stores information about each image, e.g., the image location (whether remote or local) and whether the image needs to be transmitted. The images are stored in a central image repository 132, accessible via a repository interface 130. Further details about image storing are discussed further hereinafter.

During capture, designated generally by the reference numeral 102, the document image is temporarily stored in a local cache directory 118 for subsequent transfer. It should, of course, be understood that after capture, the document may be indexed, providing a variety of textual indicators useful in later identifying that particular document from a potential myriad of similar-looking documents.

Indexes applied to and associated with each image are stored in the central database repository 134, and are referenced by the image identification number assigned during scanning. With further reference to FIG. 1, the indexing can be facilitated through use of a Configurator 140, providing additional speed and quality enhancements to processing, including cleanup of images (designated generally by the reference numeral 146), extraction of barcode values to automate data entry (designated generally by the reference numeral 148), and using database lookups to automatically populate index values. Each of these configuration parameters is preferably available to the user through a graphical user interface, requiring no specialized computer programming skills to implement.

With reference again to FIG. 1, a cache controller 120 communicates with the central database repository 134 through a cache server 122, e.g., a Web server (generally designated by the reference numeral 124), to determine whether there are any images in the local cache, i.e., the cache adjacent capture 102 (cache 118), that need to be transmitted to the central image repository 132. For each image that needs to be transmitted, the cache controller 120 sends the image to the central image repository 132 via the Web server 124, and the image record in the central database repository 134 is correspondingly updated with the image location. When indexing is complete at the user side, and all indexed images have been transmitted for storage, the cache controller 120 is notified by the database repository 134 that the document images in the temporary cache, e.g., cache 118, may be deleted.

It should, of course, be understood that the Web server 124 used for communications between the user side and the server side should be configured for maximum encryption or other security algorithms to maintain data privacy, and hinder eavesdropping or other potential intrusions.

It should be understood that the respective capture stations 102 are assigned a unique system-wide identification number, which allows the central servers to reliably know where data is coming from. Once a batch has been created, the central site, i.e., the repository, maintains an audit record of everything that happens to the batch throughout its life-cycle, and this audit is available real-time to the user. Transfer of batch data happens real-time during scan and index. Transmission of images is offloaded to an unattended application, the cache controller 120. The cache controller 120 receives all instructions from the central server, which tells it which images need to be transferred and which batches are eligible for deletion from the remote cache. The central server also provides an operations person the ability to schedule when each individual remote site 118 can send images (the transmission window), allowing Applicants to level-load the network bandwidth.

It should be readily understood that additional devices may be employed to forward non-indexed images to the central image repository 132 for storage therein. For example and with reference again to FIG. 1, a facsimile machine 110 maybe used to forward a document. For example, the facsimile machine 110 could forward the image to a facsimile server device 126, and from the facsimile server device 126 to an electronic mail server 128 for transmission, via an email import (designated generally by the reference numeral 129), to the repository interface 130 to the central image repository 132.

In a similar fashion, a networked digital scan device 112, such as a Digital Sender device made by Hewlett Packard, or a Document Centre device 114, such as made by Xerox, may be employed to scan and forward document images as electronic mail attachments to the electronic mail server 128, as discussed hereinabove. Additionally, an electronic mail application (designated generally by the reference numeral 116) could be used to forward document images as attachments to the electronic mail server 128. As discussed, all of the transmissions to the e-mail server 128 are forwarded to the image repository 132 by the e-mail import device 129. It should be understood that the e-mail import device 129 also created image records in the database repository 134, and identifies these image records as non-indexed. The non-indexed records are then available for indexing by any capture station 102 having access to the central system.

Whereas the above describes various mechanisms for the capture and transference of images and index records to the central repository, additional functions permit management and manipulation of the images on the repository side.

With reference again to FIG. 1, the various functions performed by the system, whether at the client side or repository side, are tracked and logged to a system journal 142. It should be understood that the system journal 142 creates records for such items as security violations, creation and transmission of images and indexes, metrics involving the time it takes to perform actions and who performs them, as well as audit records for who has accessed the system and what documents they have viewed.

Contents of the system journal 142 are available through an Audit and Reports interface (designated generally by the reference numeral 108) and provide the user with ad hoc report generation capabilities on any system activity.

With further reference to FIG. 1, particularly regarding repository-side functions, image index records are preferably aggregated into document records, each document record being a unique instance of all of the contextual index values applied to individual images. This process of creating document records is performed by a document maker 144, which builds the document records and preferably creates a thumbnail representation of each image within the document.

In addition to the storage of full images of documents within the repository, smaller versions thereof, i.e., thumbnail images, are also stored. Upon document capture 102 and creation, the respective images and indices corresponding thereto are transmitted to the repository, where the respective thumbnail images are created and stored in a single file by system identification number. All document images (pages) are preferably stored in a single image format (no multipage TIFFs). When a user selects a document for viewing, the first page of the document is sent in full along with preferably all thumbnail images for all pages. Since the thumbnail images are considerably smaller than the original or full image size, e.g., the thumbnail image being less than about one kilobyte in size, the user has the ability to see a representation of all of the pages of the document in order to make a further viewing selection.

It should be readily apparent to one skilled in the art that minimizing data transference in this fashion greatly improves system performance and avoids unnecessary downloads.

Other repository-side functions are available to manipulate the images, including image processing techniques and other image cleanup techniques, described hereinabove in connection with reference numeral 146. Barcode processing can also be performed at the repository side to automatically extract index values from one or more barcodes affixed to the document images, also described hereinabove in connection with reference numeral 148.

Documents stored on the system are, of course, made available for search and display by a user. For example, and with reference again to the system configuration illustrated in FIG. 1, logging onto a client-side computer, generally represented by the reference numeral 104, interfaces the user with a Web server 124, which provides access to the central database repository 134 and the central image repository 132 via the repository interface 130. This logon validates the user and the sections of the repository, or subset of documents, that the user has access to. Similarly, a query may be made at the client-side computer 104 to search for various documents stored within the repository using a number of search indices. Client execution of a query causes the repository interface 130 to generate a list of documents matching the search criteria, and returns the list to the client computer 104. The user may then select a given document from the list for viewing, the selection causing the first page of a multiple page document and thumbnail images of all of the remaining document images to be retrieved from the image repository 132 via the Web server 124 and displayed on the client computer 104. Full images of any subsequent pages of the multipage document are retrieved from the image repository 132 only if requested by the user, e.g., by clicking on a thumbnail image displayed to the user, The advantages of this system configuration over prior document centralization methods are manifest. Instead of shipping countless pounds or tons of documents to a centralized facility for scanning, indexing and storage, this functionality can be distributed with scanning and perhaps indexing being localized endeavors, e.g., at bank branches, and electronic storage being centralized at the headquarters of an organization. Outsourcing one or more of these functions, expensive equipment, know-how and manpower can save a company considerable sums and generate efficiencies within the organization by simplifying the processing of and access to such data. Further, the cost of riding the technological wave of new software and hardware, perhaps the bleeding edge thereof, can be avoided through such outsourcing, leaving the responsibility for technological advancement and capability in the hands of those skilled in the area.

Figure 2A:
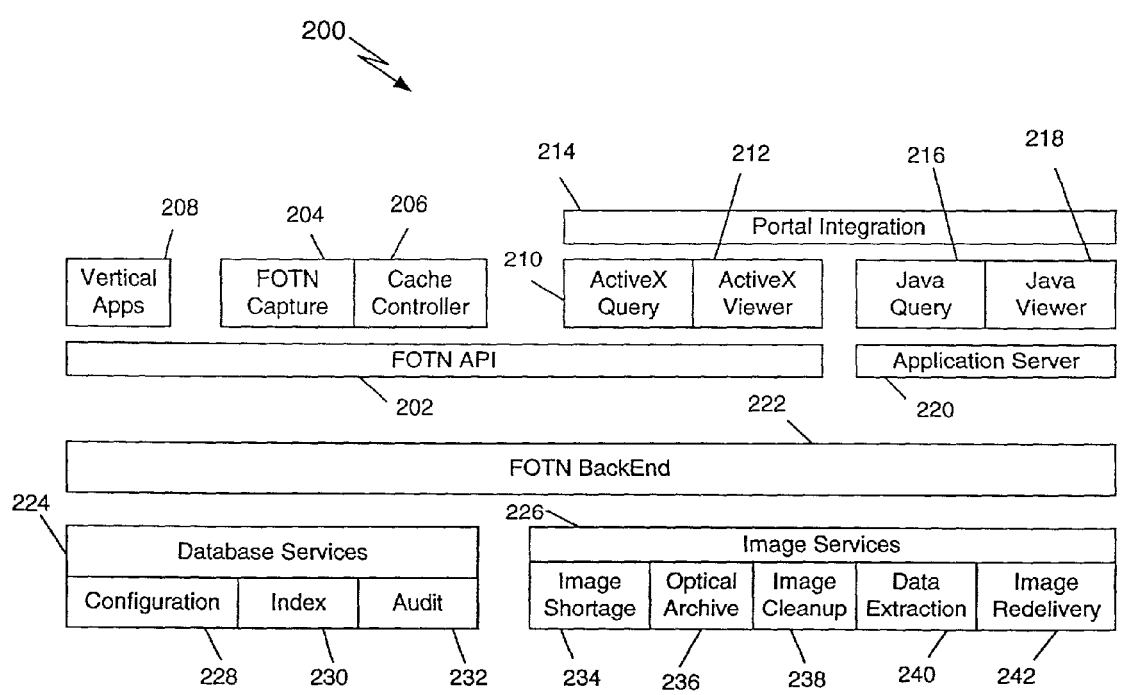
FIGS. 2A and 2B are diagrams illustrating functionality configurations pursuant to the teachings of the present invention.

With reference now to FIG. 2A, there is illustrated a functional overview of the system configuration according to the present invention, designated generally by the reference numeral 200. Applicants have created various software tools to facilitate user interaction with the data stored in the repository. An Application Program Interface 202, for example, facilitates the aforedescribed capture 102 and cache controller 120 functions, designated generally by the reference numerals 204 and 206, respectively, along with a variety of vertical applications 208. The API 202 also governs communications using ActiveX commands, e.g., an ActiveX Query 210 and an ActiveX Viewer 212, both in communication externally via a portal integration node 214. Java Queries 216 and Java Viewers 218 communicate with an Application Server 220.

Both the API 202 and the Application Server 220 govern contact with a backend program 222, e.g., the aforedescribed repository interface 130 in FIG. 1, which controls communications with database services 224 and image services 226, e.g., the aforedescribed database repository 134 and image repository 132, respectively. As illustrated in FIG. 2A, the database services 224 governs configuration 228, indexing 230 and auditing 232, and the image services 226 governs image storage 234, optical archiving 236, image cleanup 238, data extraction 240 and image redelivery 242.

Figure 2B:
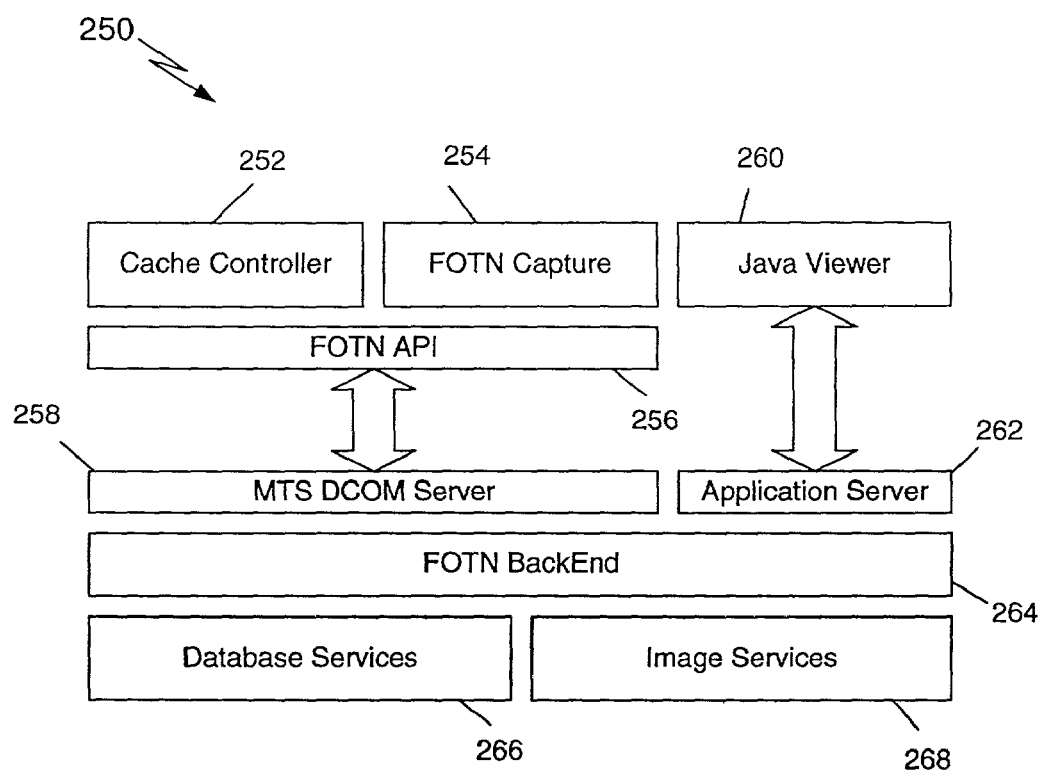

With further reference to FIG. 2B, there is illustrated a preferred function configuration, designated generally by the reference numeral 250. A cache controller 252 and a capture node 254 interface with an API 256, which, in turn, communicates with a web server 258, e.g., a Microsoft Transaction Server (MTS). Alternatively, a Java Viewer 260 may interface with an application server 262. Both the web server 258 and the application server 262 communicate, via a backend program 264, to a database services 266 and an image services 268, as discussed in more detail hereinabove in connection with FIG. 2A.

In addition to offering an improved paradigm over conventional document retention schemes, the present invention is also directed to improvements in the accessing of such documents, offering new techniques in security. As is understood in the art, security issues in the single facility model are governed by an administrator who directly controls the administration of the entire system.

The present invention employs the hierarchical concept of an account, a domain, an application and index fields to categorize the information. For example, an account represents a contract with a customer, e.g., a university, to provide document imaging services. A domain is a facet of the account, e.g., a department within the university such as student records, and an application would represent instances of the domain, e.g., admissions or transcript records. The final layer of granularity is the index field, which defines documents in applications, e.g., student name. Instead of the system administrator for the account controlling access at all levels, i.e., no granularity of control, control or access can be granted to domains or applications, distributing security to end users in multiple tiers. In other words, the system and methodology of the present invention places full control of the lookup configuration directly in the user's hands and requires no special programming to implement.

An advantage of this approach is ready reconfigurability by the user instead of an administrator. A form of distributed security is possible where only viable index fields permissible to that user are presented and others masked. One mechanism for employing this aspect of the present invention is having the user themselves use Open Database Connectivity (OBDC) protocols to define the index fields or lookups. By using a standard interface accessible to a variety of database formats, such as ODBC, the user instead of a system administrator can control or configure what they see and how.

It should further be understood that although the present invention is currently implemented in Visual BASIC with ActiveX controls, additional software tools may be employed to practice the principles of the present invention. For example, at least one such software tool is JAVA, which would offer additional benefits to this innovation.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A document image management system for managing a plurality of stored documents, said system comprising:
   a central database storing said plurality of stored documents therein; and
   a user display device for displaying thereon at least one of said stored documents, said central database forwarding said at least one document to said user display device pursuant to a given user query, said at least one document containing a plurality of images, a first of said images being a full image and the remainder of said plurality of images being a single file of thumbnail images, whereby when a user of said user display device selects a given thumbnail image from said remaining plurality of images, the central database forwards the full image corresponding to said given thumbnail image.

2. The document image management system of claim 1, further comprising a configuration element for providing speed and quality enhancements to processing image queries.

3. The document image management system of claim 2, wherein the configuration element provides speed and quality enhancements to at least one of the group consisting of: cleanup of images, extraction of barcode values to automate data entry, and using database lookups to automatically populate index values.

4. The document image management system of claim 1, wherein the thumbnail images are created and stored in a single file using a system identification number.

5. The document image management system of claim 1, wherein the stored documents include respective image identification numbers for indexing each of said plurality of images in said at least one document.

6. A method for transmitting a plurality of images within a document, said method comprising the steps of:
- selecting, by a user of a display device, said document stored within a central database; and
- transmitting, by said central database to said display device, said plurality of images corresponding to said document, a first of said images being a full image and the remainder of said plurality of images corresponding to said document being a single file of thumbnail images, whereby when said user of said display device selects a given thumbnail image from said remaining plurality of images, the central database forwards the full image corresponding to said given thumbnail image.

7. The method for transmitting a plurality of images within a document of claim 6, further comprising the step of:
- configuring indexing information to provide speed and quality enhancements when processing image queries.

8. The method for transmitting a plurality of images within a document of claim 7, wherein the step of configuring indexing information provides at least one further step from the group consisting of: cleaning up the images, extracting barcode values to automate data entry, and using database lookups to automatically populate index values.

9. The method for transmitting a plurality of images within a document of claim 6, wherein the thumbnail images are created and stored in a single file by system identification number.

10. The method for transmitting a plurality of images within a document of claim 6, wherein the document records comprise image identification numbers for indexing each of said plurality of images in said at least one document.

11. A document image management system for managing a plurality of stored documents, said system comprising:
- a document maker, said document maker creating document records for each of a plurality of documents and thumbnail representations of each image within a document;
- a central database storing said plurality of created documents therein, each document comprising a plurality of images and a corresponding plurality of image identification numbers, whereby said image identification numbers index said plurality of documents;
- a system journal, said system journal logging and tracking functions performed by the document image management system on said documents stored in said central database;
- a cache controller communicating with the central database and indicating to a user-side cache the status of images; and
- a user display device for displaying thereon at least one of said stored documents, said central database forwarding said at least one document to said user display device pursuant to a given user query, said at least one document containing a plurality of images, a first of said images being a full image and the remainder of said plurality of images being a single file of thumbnail images, whereby when a user of said user display device selects a given thumbnail image from said remaining plurality of images, the central database forwards the full image corresponding to said given thumbnail image.

12. The document image management system of claim 11, further comprising a configuration element for providing speed and quality enhancements to processing image queries.

13. The document image management system of claim 12, wherein the configuration element provides speed and quality enhancements to at least one of the group consisting of: cleanup of images, extraction of barcode values to automate data entry, and using database lookups to automatically populate index values.

14. The document image management system of claim 11, wherein the thumbnail images are created and stored in a single file using a system identification number.

15. The document image management system of claim 11, wherein the stored documents include respective image identification numbers for indexing each of said plurality of images in said at least one document.

16. A method for transmitting a plurality of images within a document, said method comprising the steps of:
- selecting, by a user of a display device, said document stored within a central database said document comprising a plurality of images and a corresponding plurality of image identification numbers, whereby said image identification numbers index said plurality of documents;
- transmitting, by said central database to said display device, said plurality of images corresponding to said document, a first of said images being a full image and the remainder of said plurality of images corresponding to said document being a single file of thumbnail images, whereby when said user of said display device selects a given thumbnail image from said remaining plurality of images, the central database forwards the full image corresponding to said given thumbnail image; and
- logging and tracking functions performed by the document image management system on said documents stored in said central database in a system journal element.

17. The method for transmitting a plurality of images within a document of claim 16, further comprising the step of:
- configuring indexing information to provide speed and quality enhancements when processing image queries.

18. The method for transmitting a plurality of images within a document of claim 17, wherein the step of configuring indexing information provides at least one further step from the group consisting of: cleaning up the images, extracting barcode values to automate data entry, and using database lookups to automatically populate index values.

19. The method for transmitting a plurality of images within a document of claim 16, wherein the thumbnail images are created and stored in a single file by system identification number.

20. The method for transmitting a plurality of images within a document of claim 16, wherein the document records comprise image identification numbers for indexing each of said plurality of images in said at least one document.

* * * * *